July 6, 1965

C. H. SNYDER 3,193,103

POND FILTER

Filed April 6, 1962

INVENTOR.
CLIFFORD H. SNYDER
BY
William D. Carothers
HIS ATTORNEY

INVENTOR.
CLIFFORD H. SNYDER
BY
William L. Carothers
HIS ATTORNEY

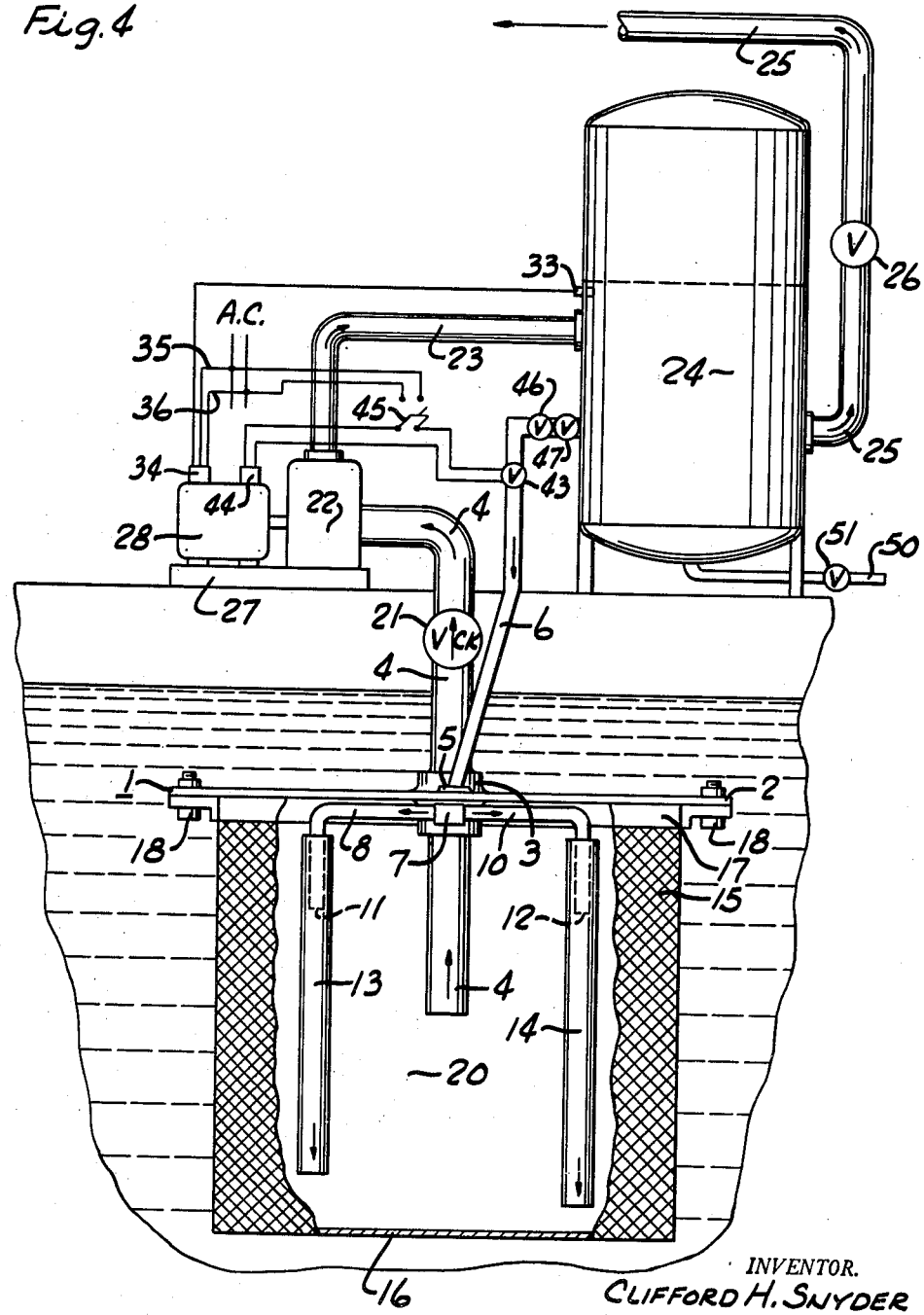

United States Patent Office 3,193,103
Patented July 6, 1965

3,193,103
POND FILTER
Clifford H. Snyder, Sunnyhill Farms, R.D. 1,
Imperial, Pa.
Filed Apr. 6, 1962, Ser. No. 185,568
7 Claims. (Cl. 210—143)

This invention relates generally to suction line filters and more particularly to filters for use in ponds, creeks, and lakes.

Clogging of suction lines and filters has been a long existing problem in connection with pumping particularly from natural water sources. Such clogging problems develop from dirt, muck, mud, clay, sand, algae, leaves, organic matter and other foreign material which are sucked onto or otherwise deposited on the filter screen thus reducing or completely shutting off the opening and the water source therethrough. Such occurrences frequently result in burning up the pump or motor.

The use of farm ponds for human water source, cattle water source, and fire protection is becoming increasingly widespread. Algae, rapid growth of which occurs in farm ponds, is accelerated by pond and water shed fertilization.

In the event of strainer clogging and whether the cause is masses of algae or other foreign material, it is generally necessary to take the filter out of the water. This requires fishing the filter and suction pipe from the water. Frequently the suction pipe must be dismantled and removed, the filter disassembled and cleaned by hand, the filter and pipe reassembled and the pipe, strainer and filter assembly repositioned under water. Often a boat and grapple hooks must be employed to fish the filter and suction pipe from the water. In other cases diving under the water is necessary. In any case cleaning the filter screens is a laborious procedure. In winter times fishing the unit from the water or through the ice may be impossible or, at best, a tedious chore.

The principal object of this invention is the provision of a filter strainer with means for cleaning the strainer while under water.

Another object is to provide means to clean the filter quickly and effectively without the use of fishing tools or without entering the water.

Another object is to effectively clean the filter strainer by the simple expedient of turning a valve or valves.

Another object is to provide means for the prevention of clogging of the filter strainer to the point where the water flow is reduced by manipulation of valve means at regular periods.

These and other objects are accomplished by injecting fluid under pressure to varying points in the interior of the filter and discharging the same through a hose means of elastomer material that has sufficient flexibility to cause it to whip violently throughout the interior of the filter, due to the reaction forces of the air, water, or other fluid discharging from the hose under pressure and thus to direct its stream over substantially the entire inner surface of the strainer. The discharged stream forcibly cleans the strainer inside and out by removing the foreign material of whatever nature, therefrom. Further cleaning is obtained from the actual physical contact of the flexible hose with the screen. Such contact jars and vibrates the screen and further aids in the dislodgement of foreign material on the filter inside and out.

The use of air under pressure or air and water under pressure through the flexible hose operates to float the lighter debris away from the strainer and aids in its conduction through the water. Thus such debris is floated to the surface of the water and away from the strainer. In certain instances the discharge of air results in breaking and melting of the ice on the pond's surface. Air discharge at frequent and regular intervals, which may be done automatically, may prevent the ice from forming on the water surface over the strainer.

Another object is the provision of strainer cleaning means requiring no metal moving parts, bearings, gears, etc. to eliminate the problem of corrosion and abrasive wear. The air bubbles that attach themselves to this debris floats and carries it away from the strainer by conducting the debris away from the strainer and through the water, and floats it to the top. The discharge of air for a relatively short period will break up and melt the heavy thick ice and prevent the ice from forming if the discharge is at frequent intervals such as maintaining the pressure of water in a tank.

Another object is the provision of a water pump and an air pump for supplying water and air to a tank in a water distributing system for maintaining the proper pressure on the water. The air or the water under pressure may be independently discharged through the flexible tube or a mixture of both.

The action of the water and the air or the mixture of both is beneficial for maintaining the strainer clean during different seasons of the year. Again different locations or sections of the country having different soil conditions require different proportions of air and water or sequence of alternately supplying the same. This may be regulated and then automatically controlled or remotely controlled by variable orifices or valves. Once the mixture or sequence is found proper for the locality the system may be readily controlled to keep it in proper working order.

Other objects and advantages of this invention appear hereinafter in the following description and claims.

The accompanying drawings show for the purpose of exemplification without limiting this invention or the claims thereto, certain practical embodiments illustrating the principles of this invention; wherein FIG. 1 is a diagrammatic view illustrating a farm pond filter connected to a pump and tank.

FIG. 4 is a modified form of pump, tank, and filter.

Figure 1:
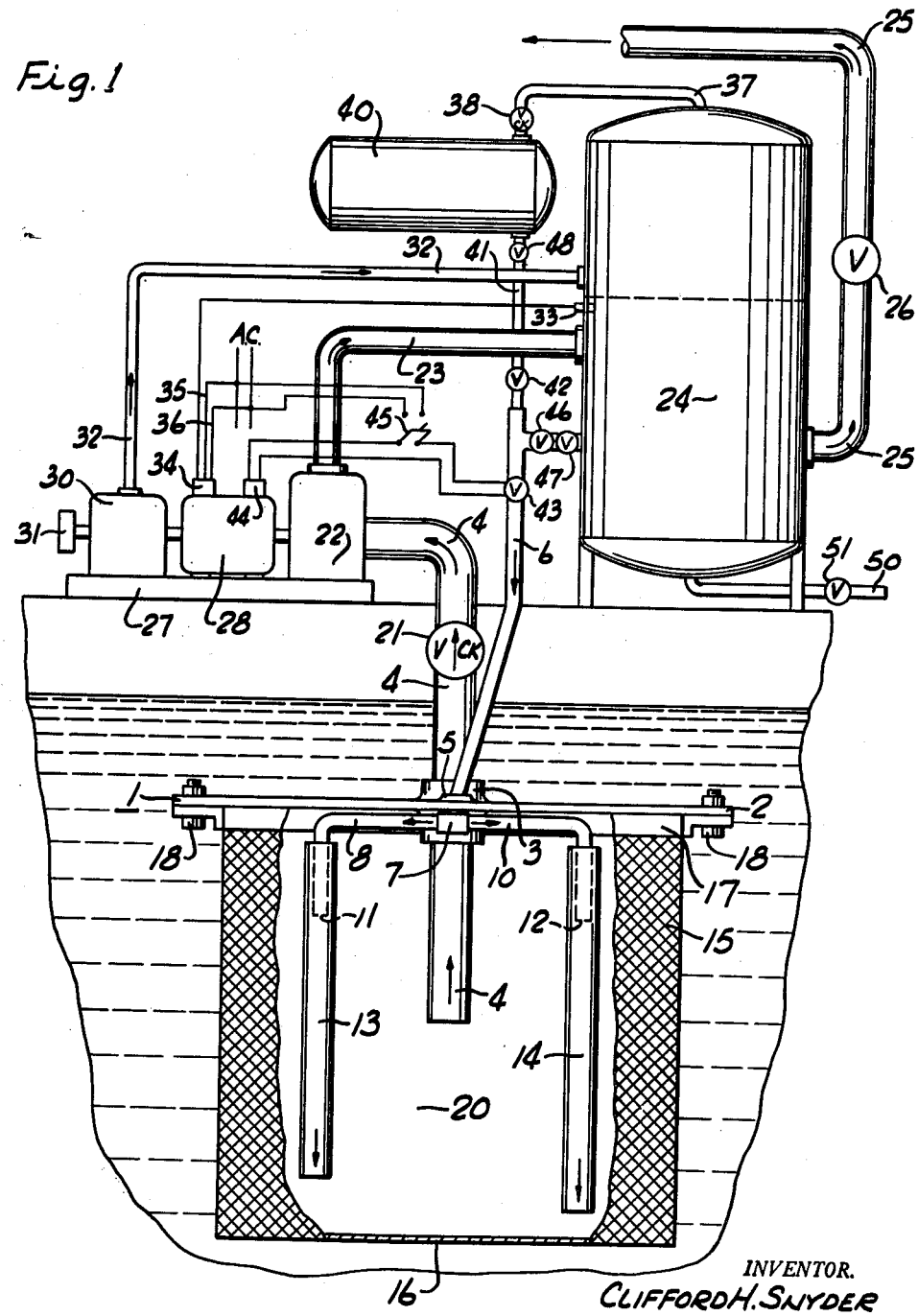

Referring to FIG. 1 the pond filter 1 is provided with a solid top plate member 2 which is preferably circular in shape and is provided with a boss 3 having an opening for receiving the suction pipe 4. A second boss 5 is provided in the top 2 to receive the pipe 6 which in this instance is the fluid pressure pipe. The pipe 6 extends through the top cover 2 and is provided with a T-connection 7 for receiving the radial branch pipe members 8 and 10, the ends of which are bent downwardly as shown at 11 and 12. The ends 11 and 12 have stretched thereover the flexible elastomer tubes 13 and 14 that have sufficient flexibility to cause them to whip violently, twisting and flailing in every possible direction so as to cover the whole of the interior of the filter due to the reaction forces of the fluid under pressure discharged from the hoses 13 and 14. Thus the stream forcibly cleans the strainer and keeps the algae and debris from covering or clogging the strainer 15 which is in the form of a cylindrical metal wire basket having suitable openings made by the weave in the wire. The bottom 16 of the strainer 15 may be made of wire mesh the same as the cylindrical side wall 15.

The upper perimeter of the cylinder 15 is provided with an annular angle iron 17 for bolting the strainer 15 to the cover 2 by means of the bolts 18.

Further strainer cleaning results from the jarring vibratory action as the flexible tubes hit the strainer at varying points.

As shown in FIG. 1 the pipe 4 extends down into the center of the chamber 20 of the strainer 15 and the flexible tubes 13 and 14 will whip in all directions and actually engage and beat each other, the such pipe 4 and the walls of the cylindrical strainer 15 as well as project its forceful stream over the entire inner surface of the strainer as they whip and lash about.

The mouth of the inlet pipe 4 is substantially at the center of the strainer chamber 20. This suction pipe extends upwardly through the boss 3 and is provided with a check valve 21 which is preferably positioned fairly close to the strainer to function as a foot valve. The suction pipe 4 extends up further to the water pump 22 which is preferably positioned in the pump house above the level of the pond indicated by the water level line. This pump is shown to be of the centrifugal type and has its discharge 23 directed to the tank 24 in the lower or water section of the tank. A discharge pipe 25 leading from the position lower than the inlet 23 from the tank 24 is for the purpose of distributing the water to the water system. A control valve for this discharge line is indicated at 26.

The pump 22 is mounted on a base 27 and is driven by the motor 28 which is also mounted on the same base. The motor 28 is also connected to the air pump 30 which supplies air from the inlet 31 to the discharge 32 which discharge line is connected to the tank 24 above the water inlet 23. Thus the air supplied to the tank provides additional air pressure for the water system. The water pump 22 is provided with a pressure control member 33 in the tank 24 which pressure control member actuates a switch in the control box 34 for starting and stopping the motor 28 within pressure limits set by the pressure limiting control 33 for the purpose of maintaining the water in the tank 24 under a given pressure at all times. Thus the control box 34 is supplied with alternating current as indicated by the lines 35 and 36 for energizing the motor 28 if the pressure drops below a predetermined amount and assuming there is no air pump and the tank 24 was empty and when initially filled with water traps air in the top of the tank and creates a pressure thereon by the adding of water to the tank. However, much improved control is had when the motor supplies air to the tank rather than to rely on the size of the tank for this purpose.

The top of the tank 24 may be provided with an air outlet 37 which is connected through the air check control valve 38 to the air tank 40. This tank functions as an additional air tank reservoir that can be supplied from the air in the tank 24 and retained in this tank until it is exhausted through the discharge line 41, the valve 42 to the fluid pressure discharge pipe 6. This pipe may also be controlled by the electrically operated valve member 43 as a function of the operation of the motor 28 through the control 44 which is supplied with electric current through the switch 45. Thus under certain conditions of suction the load on the pump be such as to open the valve 43 through the control 44 for the purpose of discharging air at considerable velocity to the interior of the strainer 15 causing the flexible hoses 13 and 14 to violently whip and clean the screen 15 through the violent whipping action and constant changing of the direction of the stream of fluid pressure issuing from the flexible hose members 13 and 14.

This air pressure may be supplemented by the use of water pressure which is admitted through the tank 24 by the valve 46 and thence travels through the control valve 43 and the fluid pressure line 6.

The remote control valves 47 and 48 in the water and air lines may be remotely controlled to admit either the pneumatic fluid pressure or hydraulic fluid pressure or mixture of both to the fluid pressure discharge line 6 from whence it is discharged through the flexible hose members 13 and 14 to violently whip and clean the whole of the area of the screen 15. The water being aerated and thereby providing air bubbles for the flotation of the algae, leaves and muck away from the strainer and also providing a means for melting heavy ice on top of the pond or maintaining the pond free of ice during freezing weather.

The bottom of the water tank is provided with a blowdown discharge pipe 50 controlled by the valve 51 for cleaning the tank.

Figure 2:
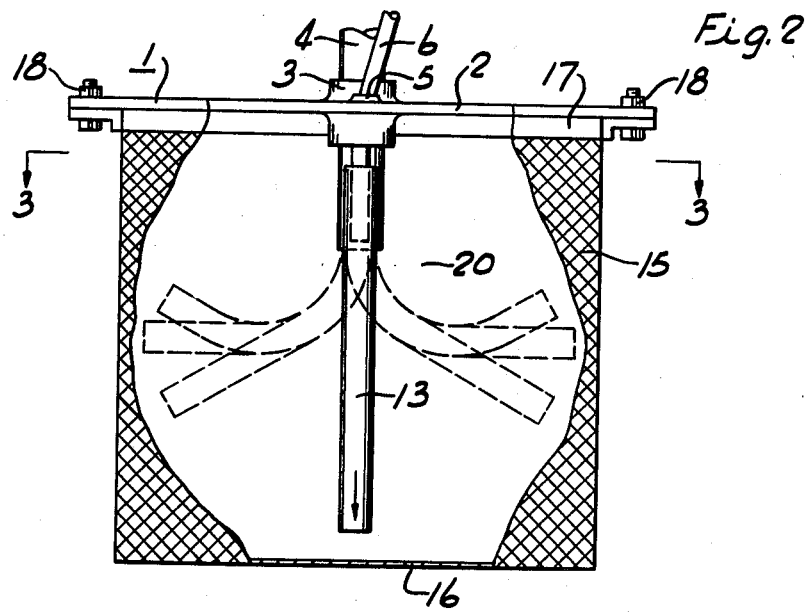
FIG. 2 is a modified form of farm pond filter.
Figure 3:
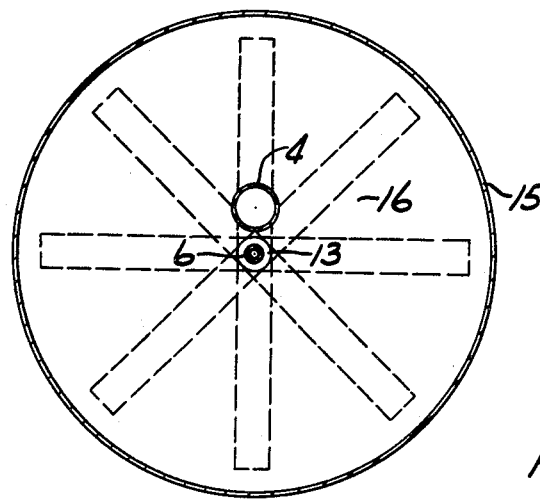
FIG. 3 is a sectional view taken on the line 3—3 of FIG. 2.

In the structure shown in FIGS. 2 and 3 the pressure discharge pipe 6 is provided with only a single flexible hose member such as indicated at 13 which is a line in the vertical central axis of the cylindrical strainer 15 and the hose 13 is not of sufficient length to strike the inner walls of the strainer 15. In this instance the pipe 6 extends below the open end of the suction pipe 4 and the hose 13 is permitted to whip in any direction but it cannot touch either the under side of the top 2 or the inner cylindrical walls 15 or the bottom 16 of the strainer thereby relying wholly upon the force of the fluid stream whether it be air, water or a combination of both that issues from the whipping hose 13.

Referring now to FIG. 4 the tank 24 is an ordinary water pressure tank and is provided with the blow down discharge pipe 50 and control valve 51. This tank is also provided with the discharge pipe 25 for the water supply system controlled by the valve 26. The motor 28 operates the pump 22 which is of the character that will pump air and water until the sufficient amount of air supply which is contained in the top of the tank is above the water line as indicated by dotted lines. This control is set by the pressure control member 33 in the same manner as previously described. The pipe 6 is likewise supplied by means of the valves 46 and 47 with water under pressure from the tank 24. The line 6 is likewise operable by the remote control valve 43.

The strainer 15 in FIG. 4 is the same as that illustrated in FIG. 1 and the water discharge 6 is connected in the same manner as previously described. Unless this connection of the pipe 6 to the tank 24 is performed at a higher point on the tank it will not discharge air; but the higher the connection to the tank 24 is placed the greater opportunity of some air being discharged through the pipe 6.

The whipping hoses 13 and 14 will of course perform in the same manner to maintain the strainer 15 clean. This view illustrates that the device may be operated in conjunction with the ordinary type of water pressure tank.

I claim:

1. A farm pond pump filter comprising a pump, a strainer for submersion in a pond, a suction pipe having its open end in said strainer and connected to said pump, a fluid pressure pipe having its open end in said strainer for supplying fluid under pressure thereto, flexible hose means of elastomer material secured on the open end of said fluid pressure pipe to convey fluid under pressure therefrom and into said strainer, said hose means having sufficient flexibility and of sufficient length to cause it to whip due to the reaction forces of the fluid under pressure discharged therefrom and to direct a stream over the entire inner surface of said strainer to remove and keep algae and debris from covering and clogging and entering said strainer, a fluid pressure tank to receive the output of said pump, an air chamber at the top of said tank, valvular means connecting said fluid pressure pipe to said tank to supply fluid under pressure to said strainer, said valvular means supplying air and water from said fluid pressure tank to said fluid pressure pipe, and an air pump to supply air under pressure to said tank.

2. A farm pond pump filter comprising a pump, a strainer for submersion in a pond, a suction pipe having its open end in said strainer and connected to said pump, a fluid pressure pipe having its open end in said strainer for supplying fluid under pressure thereto, flexible hose means of elastomer material secured on the open end of said fluid pressure pipe to convey fluid under pressure therefrom and into said strainer, said hose means having sufficient flexibility and of sufficient length to cause it to whip due to the reaction forces of the fluid under pressure discharged therefrom and to direct a stream over the entire inner surface of said strainer to remove and keep algae and debris from covering and clogging and entering said strainer, a fluid pressure tank to receive the output of said pump, an air chamber at the top of said tank, valvular means connecting said fluid pressure pipe to said tank to supply fluid under pressure to said strainer, said valvular means supplying air and water from said fluid pressure tank to said fluid pressure pipe, and an additional air pressure tank means connected to said fluid pressure pipe opening into said strainer.

3. A filter for use on a pump such as a farm pond pump comprising a suction pipe having its mouth opening surrounded by a strainer, a fluid pressure pipe with its open end extending into said strainer and means for supplying fluid under pressure thereto, flexible hose means of elastomer material secured on the open end of said fluid pressure pipe, said hose means having sufficient flexibility and being of sufficient length to whip due to the reaction forces of the fluid under pressure discharged therefrom, thereby directing the fluid under pressure over various surfaces of the strainer to clean the strainer while the filter is under water, wherein said means for supplying fluid under pressure consists of a pump connected to said suction pipe, tank means connected to said pump and said fluid pressure pipe, pressure control means on said tank means to operate said pump when the pressure in said tank reaches a predetermined level.

4. A filter for use on a pump such as a farm pond pump comprising a suction pipe having its mouth opening surrounded by a strainer, a plurality of fluid pressure pipes with their open ends extending into said strainer and means for supplying fluid under pressure thereto, flexible hose means of elastomer material secured on the open ends of said fluid pressure pipes, said hose means having sufficient flexibility and being of sufficient length to whip due to the reaction forces of the fluid under pressure discharged therefrom, said whipping flexible hose means having sufficient length to strike and jar said strainer at various places while directing the fluid under pressure over various surfaces of the strainer to clean the strainer when the filter is under water, said means for supplying fluid under pressure further consists of an automatic electrically operated valve means supplying fluid under pressure to said fluid pressure pipes to operate upon an increase or decrease of the load on said pump.

5. A pond pump filter system comprising a liquid pump, motor means to operate said liquid pump, a cage strainer for submersion in a pond, a suction pipe having its mouth open in said strainer and connected to said liquid pump, a pressure pipe having its open end in said strainer for supplying fluid under pressure thereto, flexible hose means of elastomer material secured on the open end of said pressure pipe to convey fluid under pressure into said strainer and to whip and lash about due to reaction forces of the fluid under pressure leaving said hose means to remove and keep algae and debris from the surface of said strainer, tank means having a liquid and an air chamber, said liquid chamber to receive the output from said liquid pump, an air pump driven by said motor means to supply air under pressure to the air chamber of said tank means, pipe lines from said tank means connected to said pressure pipe, valvular means in said pipe lines to supply air or liquid or a mixture thereof to said pressure pipe.

6. The filter system of claim 5 characterized by a pressure control member on said tank means set within a pressure limit and electrically connected to said motor means to start said motor means when the lower pressure limit is reached in said tank means and stop said motor means when the higher pressure limit is obtained.

7. The filter system of claim 5 characterized by an electrically operated valve member in said pressure pipe to open and permit passage of air or liquid or a mixture thereof to said pressure pipe upon actuation, control means on said motor means to actuate said valve member upon increase of the load on said motor means due to increased load on said liquid pump.

References Cited by the Examiner

UNITED STATES PATENTS

| | | | |
|---|---|---|---|
| 1,212,978 | 6/17 | Malone | 210—393 |
| 1,724,436 | 8/29 | Sweetland | 210—412 |
| 2,603,354 | 6/52 | Way | 210—82 |
| 2,641,364 | 6/53 | Depallens | 55—302 |
| 2,857,202 | 10/58 | Snyder | 210—456 X |
| 2,899,063 | 8/59 | Ellis | 210—169 |
| 2,914,180 | 11/59 | Konopka et al. | 210—407 |
| 2,919,704 | 1/60 | Butler | 210—393 |

FOREIGN PATENTS

| | | |
|---|---|---|
| 507,101 | 1/30 | Germany. |
| 931,083 | 8/55 | Germany. |

REUBEN FRIEDMAN, *Primary Examiner.*

HERBERT L. MARTIN, *Examiner.*